United States Patent
Bonnell et al.

(10) Patent No.: US 10,423,641 B2
(45) Date of Patent: Sep. 24, 2019

(54) HIERARCHICAL COHERENCY LOG FOR MANAGING A DISTRIBUTED DATA STORAGE SYSTEM

(71) Applicant: NetApp, Inc., Sunnyvale, CA (US)

(72) Inventors: Eric Bonnell, Boulder, CO (US); William Hetrick, Eastborough, KS (US); Theresa Lynn Segura, Broomfield, CO (US); Eric Keighin, Boulder, CO (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 15/446,813

(22) Filed: Mar. 1, 2017

(65) Prior Publication Data

US 2017/0177689 A1    Jun. 22, 2017

Related U.S. Application Data

(63) Continuation of application No. 13/871,518, filed on Apr. 26, 2013, now Pat. No. 9,607,065.

(51) Int. Cl.
   *G06F 16/27* (2019.01)
   *G06F 16/22* (2019.01)
   *G06F 16/23* (2019.01)

(52) U.S. Cl.
   CPC .......... *G06F 16/27* (2019.01); *G06F 16/2237* (2019.01); *G06F 16/2358* (2019.01)

(58) Field of Classification Search
   CPC ............... G06F 17/30575; G06F 16/27; G06F 16/2237; G06F 16/2358
   USPC ........ 711/103, 114, 162, 154, 170, E12.008, 711/100, 156, 161, E12.002, E12.058, 711/E12.103, 104, 108, 117, 118, 144, 711/153, 158, 163, 168, 169, 173, 202, 711/210, 221; 707/634, 747, 610, 639, 707/685, 690, E17.005, E17.009, 707/E17.061, E17.128, 609, 629, 635, 707/637, 638, 646, 647, 649, 650, 655, 707/656, 741, 797; 714/6.24, 6.1, 6.21, 714/6.22, 6.23, 6.3
   See application file for complete search history.

(56) References Cited

U.S. PATENT DOCUMENTS

6,993,635 B1    1/2006  Gazit et al.
7,395,378 B1    7/2008  Pendharkar et al.
(Continued)

*Primary Examiner* — Jay A Morrison
*Assistant Examiner* — Ken Hoang
(74) *Attorney, Agent, or Firm* — Haynes and Boone, LLP (57) ABSTRACT

A system and method for managing distributed coherent datasets using a hierarchical change log is provided. In some embodiments, a distributed storage system is provided that includes a primary storage device containing a primary dataset and a mirror storage device containing a mirror dataset. The mirror dataset includes a coherent copy of the primary dataset. The distributed storage system further includes a hierarchical change log tracking a coherence state for the mirror dataset. The hierarchical change log includes a first sub-log and a second sub-log, and a block range of the first sub-log overlaps a block range of the second sub-log. The hierarchical change log may define a priority relationship between the first sub-log and the second sub-log governing the overlap. The first sub-log and the second sub-log may be independently configured and may be different in one of a representation and a block size.

20 Claims, 8 Drawing Sheets

(56) References Cited

U.S. PATENT DOCUMENTS

| | | | |
|---|---|---|---|
| 7,406,487 | B1 | 7/2008 | Gupta et al. |
| 8,401,998 | B2 | 3/2013 | Madhavarapu |
| 8,578,393 | B1 * | 11/2013 | Fisher .................. G06F 11/3476 709/200 |
| 8,793,223 | B1 | 7/2014 | Cho et al. |
| 9,367,579 | B1 * | 6/2016 | Kumar .............. G06F 17/30144 |
| 2005/0193248 | A1 | 9/2005 | Idei et al. |
| 2010/0229182 | A1 * | 9/2010 | Ito ........................... G06F 9/546 719/314 |
| 2011/0099342 | A1 * | 4/2011 | Ozdemir ............. G06F 11/2066 711/162 |
| 2011/0231820 | A1 | 9/2011 | Upadhyaya |

\* cited by examiner

HIERARCHICAL COHERENCY LOG FOR MANAGING A DISTRIBUTED DATA STORAGE SYSTEM

CLAIM TO PRIORITY

This application is a continuation of U.S. patent application Ser. No. 13/871,518, filed on Apr. 26, 2013, now allowed, which is hereby incorporated by reference in its entirety.

TECHNICAL FIELD

The present description relates to distributed data storage and more specifically to the management of coherent datasets.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput. Building out the storage architecture to meet these expectations enables the next generation of applications, which come with even greater demands.

One technique used in distributed storage is the creation and management of multiple copies of data. This may be known as mirroring. The copies may be used for data backup as well as to improve storage performance. Typically, a controller monitors changes to the data in order to maintain coherency across the mirrors. When changes such as write requests are received, the controller may update the mirrors synchronously (as changes are received) or asynchronously (independent of when the changes are received). Synchronous schemes tend to place more of a burden on the storage devices and their connections and deliver reduced performance in the interest of simplicity. Asynchronous schemes may provide improved performance, but require more careful monitoring of the coherency. In both cases, tracking changes imposes an overhead that delays data requests, consumes bandwidth, and mitigates some of the benefits of mirroring. Thus, while conventional storage management techniques have proved generally adequate, further improvements to reduce management overhead are desirable.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. The headings are solely for formatting and should not be used to limit the subject matter in any way, because text under one heading may cross reference or apply to text under one or more headings. Finally, in view of this disclosure, particular features described in relation to one aspect or embodiment may be applied to other disclosed aspects or embodiments of the disclosure, even though not specifically shown in the drawings or described in the text.

The present disclosure relates to distributed data storage and to management of coherent datasets. In some embodiments, the coherent datasets are managed copies where changes to one dataset are eventually mirrored to the remaining datasets. Particularly in asynchronous management schemes, changes may be written to a primary dataset first and then pushed out to other mirrored datasets at a more convenient time. To prevent out-of-date data from being read from the mirrored copies, a change log may be maintained for each mirror copy that specifies the portions of the mirror dataset that are out-of-date, for example, changes to the primary dataset that have not yet been received by a mirror. Particularly with large datasets, the computing resources devoted to maintaining the change logs can be considerable.

In order to reduce this computing burden, in some embodiments, each mirror dataset has its own hierarchical change log. A hierarchical change log may include any number of sub-logs, each with a respective priority level. When sub-logs have conflicting coherence information, higher priority sub-logs take precedence over lower priority sub-logs. This arrangement introduces flexibility as sub-logs of any priority level may be optimized independently. For instance, in some embodiments, higher priority sub-logs are optimized for faster searching, while lower priority sub-logs are optimized for greater detail and granularity. In some embodiments, higher priority sub-logs are optimized for faster writes. In some embodiments, a higher priority sub-log is optimized to track a synchronization operation, which tends to be sequential and highly organized. Using an optimized sub-log can greatly reduce the overhead involved in performing the synchronization operation, without affecting the sub-logs used to track other types of data transactions. Other applications that leverage the advantages of a hierarchical change log are disclosed in greater detail below. In these ways and others, the use of a hierarchical change log reduces the processing resources used to track the coherence of the mirror datasets. Of course, these advantages are exemplary and non-limiting, and no particular advantage is required for any particular embodiment.

Figure 1A:
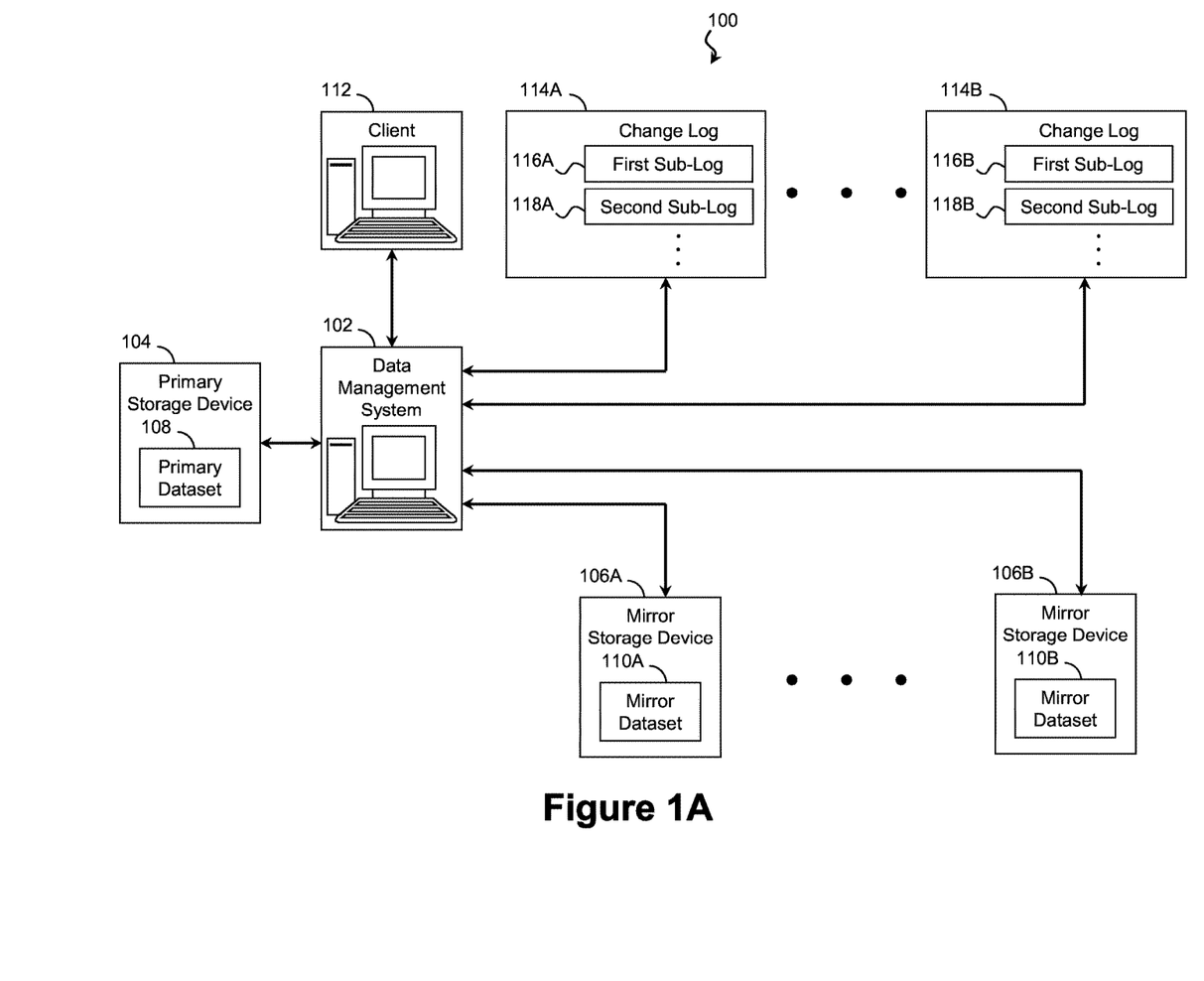
FIGS. 1A and 1B are system diagrams of computing infrastructures operable to provide data and storage space according to aspects of the present disclosure.

FIG. 1A is a system diagram of a computing infrastructure 100 operable to provide data and storage space according to aspects of the present disclosure. The computing infrastructure 100 contains a data management system 102, a primary storage device 104, and one or more mirror storage devices 106A and 106B, of which two are shown. This is merely exemplary, as it is understood that the principles of the present disclosure may be extended to any number of mirror storage devices 106. As disclosed in detail below, the data management system 102 establishes and maintains a mirror relationship between a primary dataset 108 on the primary storage device 104 and one or more secondary or mirror datasets 110A and 110B of the mirror storage devices 106A and 106B, respectively. This may include handling read and write requests from clients 112 directed to the storage devices, monitoring updates from the primary storage device 104 to the mirror storage devices 106A and 106B, and performing other data management tasks. Accordingly, the data management system 102 includes a computer processing resource (e.g., a CPU, a GPU, an ASIC, an FPGA, a DSP, etc.) and may include a communications resource (e.g., a wired or wireless communications resource), a storage resource (e.g., volatile and/or non-volatile storage resources), and/or other computing resources. The data management system 102 maintains one or more change logs (e.g., change logs 114A and 114B) that contain a record of differences in a copy of a mirrored data stored at a respective mirror storage device. Each change log may contain one or more sub-logs (e.g., sub logs 116A, 116B, 118A, and 118B).

The data management system 102 may take the form of a rack-mounted device, a blade-based device, a desktop computing device, a personal computing device, a laptop, a personal digital assistant, a tablet computer, a mobile phone, and/or another suitable computing form factor. In some embodiments, the data management system 102 includes a cluster of processing subsystems and/or computing resources. Each subsystem may, in itself, contain a grouping of other systems. In yet further embodiments, the data management system 102 is implemented as a distributed architecture.

The primary storage device 104 and the mirror storage devices 106 may be any suitable data storage medium, and, in that regard, may include one or more volatile or non-volatile storage media such as, but not limited to, a magnetic storage medium, a solid-state storage medium, an optical storage medium, a cache memory medium, a Random Access Memory (RAM) module, and/or another suitable medium. The storage media may be represented as one or more logical volumes, virtual constructs used to abstract the underlying media. In some embodiments, at least one of the primary storage device 104 and/or the mirror storage devices 106 includes a Storage Area Network (SAN) device. SAN devices connect directly to a network and communicate using a block-level protocol such as iSCSI or Fibre Channel. SAN devices typically appear to clients 112 to be a single monolithic device directly connected to the client 112. In some embodiments, at least one of the primary storage device 104 and/or the mirror storage devices 106 includes a Network Attached Storage (NAS) device. NAS devices connect directly to a network and communicate using a file-level protocol such as NFS or SMB/CIFS. NAS devices typically appear to clients 112 to be a server offering to share a storage device. In some embodiments, the primary storage device 104 and/or the mirror storage devices 106 include a logical volume that abstracts the storage medium.

The change logs 114A and 114B may be stored in any suitable volatile and/or non-volatile storage medium such as, but not limited to, a magnetic storage medium, a solid-state storage medium, an optical storage medium, a cache memory medium, a Random Access Memory (RAM) module, and/or another suitable medium. In one embodiment, change log 114A is stored within the respective mirror storage device 106A tracked by change log 114A, whereas change log 114B is stored within the respective mirror storage device 106B tracked by change log 114B. In a further embodiment, change logs 114A and 114B are stored within a storage medium distinct and separate from mirror storage devices 106A and 106B. In some embodiments, change logs 114A and 114B are stored within a component of the data management system 102 such as a volatile and/or non-volatile storage medium of the data management system 102.

The data management system 102 communicates with the primary storage device 104 and the mirror storage devices 106A and 106B using any suitable protocol over any suitable communications channel. In an embodiment, the data management system 102 is directly coupled to the primary storage device 104 and to the mirror storage devices 106A and 106B via a data bus, such as SCSI, PCI Express, Serial ATA, IDE/EIDE, USB, or IEEE 1394, over a wired (electrical, optical, etc.) or wireless channel. In a further embodiment, the data management system 102 is coupled to one or more of the storage devices via a network such as a local-area network (LAN), a wide area network (WAN), a telecommunications network, a cellular communications network, and/or the Internet.

Figure 1B:
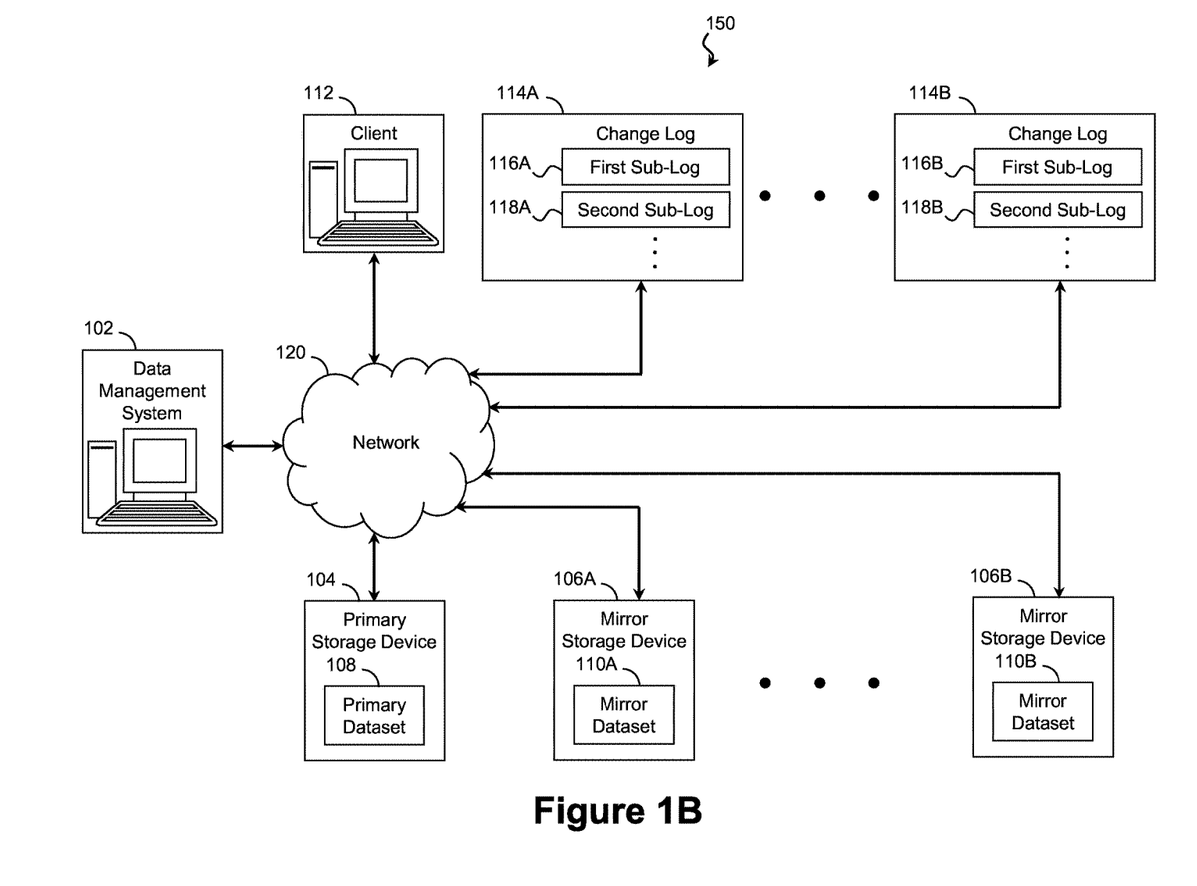

As an example of one such configuration, referring now to FIG. 1B, illustrated is a system diagram of another computing infrastructure 150 according to aspects of the present disclosure. The computing infrastructure 150 contains a data management system 102, a primary storage device 104, and mirror storage devices 106A and 106B, of which two are shown. Each of these is substantially similar to the respective element of FIG. 1A. In that regard, the data management system 102 establishes and maintains a mirror relationship between the primary dataset 108 and the mirror datasets 110A and 110B.

As illustrated in FIG. 1B, the trend toward greater connectivity has given rise to computing infrastructures 150 deployed across a network 120. The network 120 may be any private or public network including a local-area network (LAN), a wide area network (WAN), a telecommunications network, a cellular communications network, and/or the Internet. As illustrated, the data management system 102 may communicate with the primary storage device 104, the mirror storage device 106A and 106B, and/or the client 112 via the network 120. In some embodiments, the data management system 102 may also access the change logs 114A and 114B via the network 120. As one of skill in the art will recognize, the computing infrastructure 150 is suitable for use as part of a "cloud computing" system where, from the client's 112 perspective, the infrastructure 150 provisions resources on demand without regard for the underlying hardware.

As disclosed above, the data management system 102 controls the mirror relationship between the primary storage device 104 and the mirror storage devices 106A and 106B. In a mirror relationship, multiple copies of a dataset are distributed across devices. This may provide redundancy in the event of a device failure and may reduce latency by servicing data requests using the nearest storage device or the storage device that is least busy. The datasets on each device are coherent but not necessarily identical. Coherent datasets may match or, where they are divergent, a record of the differences may be made available. The record (sometimes referred to as a change log, difference log, or delta log) allows a storage device with a partially out-of-date dataset to fulfill data requests directed to the up-to-date portion.

The mirroring scheme implemented by the data management system 102 governs the coherency of the mirror datasets. Synchronous mirroring schemes update each of the mirror storage devices as data requests are received. In such a scheme, the data management system 102 may wait until the final storage device has updated to confirm that a transaction has been completed. Synchronous schemes have an advantage in that each device typically has an up-to-date copy of the dataset. However, the simplicity and redundancy of synchronous mirroring may come at the expense of performance. Particularly when device latency is high, data transactions may be delayed while waiting for each storage device to update.

In contrast, asynchronous mirroring schemes may delay the updating of certain datasets. For example, in some embodiments, one of the datasets is designated as a primary dataset 108, while the remaining datasets are designated as secondary or mirror datasets (e.g., datasets 110A and 110B). Updates to the primary dataset 108 may be made when the data requests are received, while updates to the mirror datasets 110A and 110B may be delayed until a more opportune time. In one such embodiment, the data management system 102, implementing an asynchronous mirroring scheme, receives a data request from a client 112, updates the primary dataset 108, and reports to the client 112 that the corresponding transaction has been completed. The data management system 102 may not necessarily update the mirror datasets 110A and 110B before reporting that the request has been completed. Instead, to prevent subsequent data requests to the un-updated datasets 110A and 110B, the data management system 102 marks the respective data as modified in a change log (e.g., change logs 114A and 114B) maintained for each of the mirror datasets 110A and 110B. Because the data is marked as modified for the mirror datasets 110A and 110B, further requests directed to the modified data are serviced by the primary dataset 108 until the mirror datasets 110A and 110B are updated. The change logs 114A and 114B are modified again once the mirror datasets 110A and 110B are updated.

One of skill in the art will recognize that maintaining change logs 114 for a complicated dataset may entail considerable overhead. In addition to writing to the change logs 114, the data management system 102 may search the respective change log before servicing any read requests from a mirror dataset. To reduce this computational overhead, in some embodiments, the data management system 102 utilizes a hierarchical change log. The hierarchical change log includes multiple sub-logs, each containing coherence states for a subset (or block range) of a mirror dataset 110. For example, in one such embodiment, change log 114A includes at least a first sub-log 116A and a second sub-log 118A, and change log 114B includes at least a first sub-log 116B and a second sub-log 118B. Because the block ranges of the sub-logs may overlap (i.e., sub-log 116A may contain a block also contained in sub-log 118A), the change log 114 defines a priority relationship between the constituent sub-logs. Coherence states in a sub-log with higher priority take precedence over coherence states in a sub-log with lower priority. Accordingly, to determine a coherence state of a portion of a dataset, the highest priority sub-log is queried first. If the highest priority sub-log does not specify the portion as either modified or unmodified, the next highest priority sub-log is queried, and so on. In some embodiments, a sub-log includes a priority indicator such a numerical priority value that describes a priority relationship between the sub-log and others. In some embodiments, a change log includes a priority indicator for one or more constituent sub-logs, where the priority indicators are not necessarily included in the respective sub-logs.

In order to improve performance of the hierarchical change log 114, each sub-log may be independently optimized. For example, a sub-log may be configured based on a property of a corresponding data transaction, a property of the dataset such as average file size, on a property of a search performed on the sub-log, on other sub-log properties such as read and write speed, and/or other suitable properties. In an embodiment, a sub-log tracks a sequential write transaction such as a dataset synchronization operation and is optimized for sequential ranges by incorporating a sparse matrix representation disclosed below. In a further embodiment, a sub-log tracks a series of writes to random blocks and is optimized for random patterns by incorporating a bitmap representation also disclosed below. Higher priority sub-logs, which are queried more often, may be optimized to improve query speed. Some sub-logs may be optimized for quick writing. Further embodiments incorporate other configurations and types of sub-logs.

Figure 2:
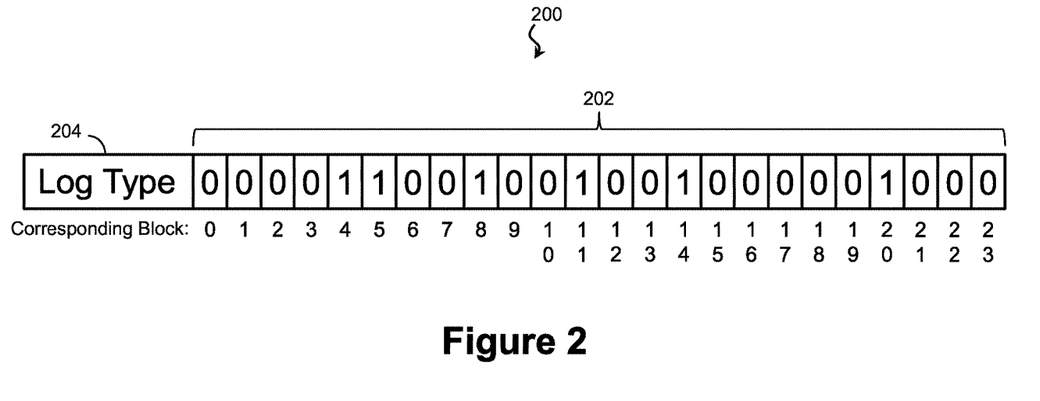
FIG. 2 is a diagram of a bitmap change log according to aspects of the present disclosure.
Figure 3:
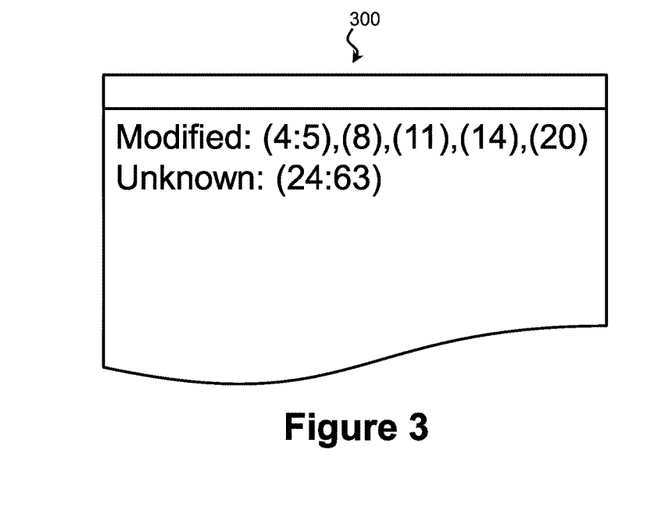
FIG. 3 is a diagram of a sparse matrix change log according to aspects of the present disclosure.

As disclosed above, a hierarchical change log 114 and the constituent sub-logs may include any suitable representation of the dataset, two types of which are disclosed with reference to FIGS. 2 and 3. FIG. 2 is a diagram of a bitmap change log 200 according to aspects of the present disclosure. The bitmap change log 200 is suitable for use as a change log, such as change logs 114A and 114B of FIGS. 1A and 1B, and/or as a component of a change log, such as a sub-log. In embodiments utilizing a hierarchical change log, the bitmap change log 200 is suitable for use as a sub-log at any level of priority or hierarchy. A bitmap change log 200 includes a set 202 of bits where each bit represents the coherence state of a corresponding block of data within a mirror dataset 110. In an exemplary embodiment, a stored "1" value indicates that the corresponding block of data has been modified and is not up-to-date in the respective mirror dataset 110, whereas a stored "0" value indicates that the corresponding block of data has not been modified and is up-to-date. In some embodiments utilizing a hierarchical change log 114, a sub-log 200 may represent a third state (not shown), "unknown," that instructs the query algorithm to query the next sub-log in the hierarchy. In one such embodiment, two logical bits are used for each block to encode the three coherence states: modified, unmodified, and unknown. As an alternative, a sub-log 200 may be assigned a type that determines how the states are encoded. For example, a sub-log 200 may be designated as a positive bitmap (e.g., "1" represents a modified block and "0" represents unknown or vice versa), a negative bitmap (e.g., "1" represents an unmodified block and "0" represents unknown or vice versa), or an absolute bitmap (e.g., "1" represents modified and "0" represents unmodified or vice versa). In such embodiments, the bitmap sub-log 200 may include a type field 204 indicating the designation.

The bitmap change log or sub-log 200 designates the coherency of the dataset according to blocks. These blocks may take any size and may correspond to any range of physical and/or logical addresses. For example, a bit of the bitmap 200 may represent the coherence state of a 4K segment of the dataset. Larger block sizes result in a smaller, more manageable, bitmap, but the lost granularity increases the frequency with which unmodified data sharing a block with modified data is marked as modified. Thus, smaller block sizes have greater granularity but may result in a bitmap that is slower to search.

To provide a balance of speed and granularity, in some embodiments utilizing a hierarchical change log 114, the sub-logs have different granularities. For example, higher priority sub-logs may have relatively larger block sizes for rapid searching. The increased search time for higher granularity sub-logs may be mitigated if such sub-logs are only queried when the higher priority sub-logs do not have corresponding entries. Accordingly, lower priority sub-logs may utilize smaller block sizes for greater precision without a sizeable impact on performance. However, in some embodiments, the relationship is reversed, and higher priority sub-logs have a higher granularity than lower priority sub-logs.

Referring now to FIG. 3, illustrated is a diagram of an exemplary sparse matrix change log 300 according to aspects of the present disclosure. The sparse matrix change log 300 is suitable for use as a change log, such as change logs 114A and 114B of FIGS. 1A and 1B, and/or as a component of a change log, such as a sub-log. In embodiments utilizing a hierarchical change log, the sparse matrix change log 300 is suitable for use as a sub-log at any level of priority or hierarchy.

A sparse matrix format reduces the memory footprint of the change log by only storing a portion of the block space and populating the remainder as needed with a default value. For example, in an embodiment, the block ranges of modified portions of the dataset are stored, signifying that block ranges not in the change log 300 correspond to unmodified portions of the dataset. In a further embodiment, the block ranges of unmodified portions of the dataset are stored. As a sparse matrix change log 300 is suitable for use as a sub-log, in various embodiments, the sparse matrix sub-logs 300 include any combination of two of the three coherence states: modified, unmodified, and unknown. The remaining state may be inferred. In one such embodiment, the sparse matrix sub-log 300 includes block ranges of modified portions of the dataset stored in a first list and block ranges of unknown portions of the dataset stored in a second list. The remaining blocks are understood to be unmodified. In another such embodiment, the block ranges of modified portions of the dataset are stored in a first list, while block ranges of unmodified portions of the dataset are stored in a second list. In the embodiment, for address ranges not specified in either list, the determination is based on the next sub-list in the hierarchy. One of skill in the art will recognize that the principles of the present disclosure apply equally to any suitable representation of a sparse matrix change log or sub-log 300 including dictionary-of-keys, list-of-lists, and coordinate-based representations.

The advantages of a sparse matrix representation include first the small footprint. Storing only a portion of the data may make the sparse matrix change log 300 faster to retrieve from memory, to read, to query, and/or to write. The effect is compounded when the stored portions (in an embodiment, the modified blocks) are less numerous than the unstored portions (in the embodiment, the unmodified blocks). Another advantage that may make the sparse matrix representation more efficient is the ability to concisely represent ranges of contiguous blocks. Particularly when the transaction being tracked modifies data sequentially, range endpoints can be quickly updated in a sparse matrix log or sub-log 300. In some embodiments, performance is further increased by using a sparse matrix representation optimized for rapid querying such as a sorted list or a hash. Other advantages will be recognized by one of skill in the art.

It is understood that the change logs or sub-logs of FIGS. 2 and 3 are merely exemplary and that any other suitable representation may be used either additionally or in the alternative.

Figure 4:
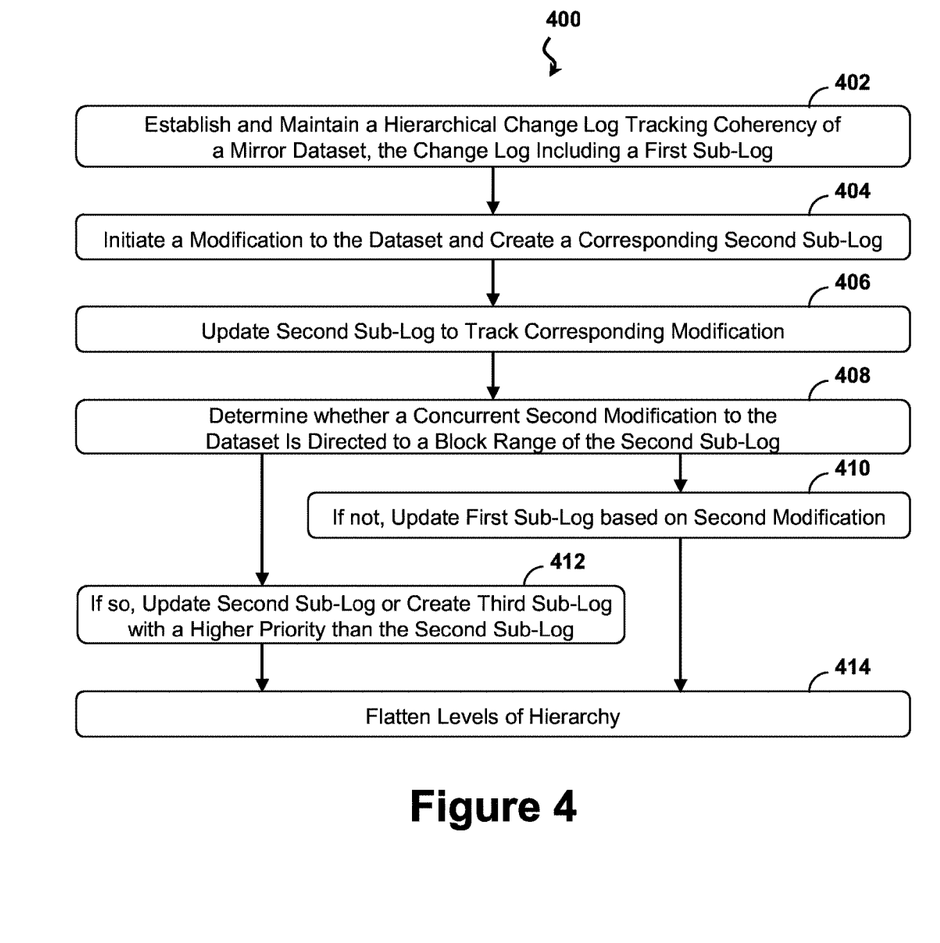
FIG. 4 is a flow diagram of a method of asynchronously managing a mirror dataset utilizing a hierarchical change log according to aspects of the present disclosure.
Figure 5:
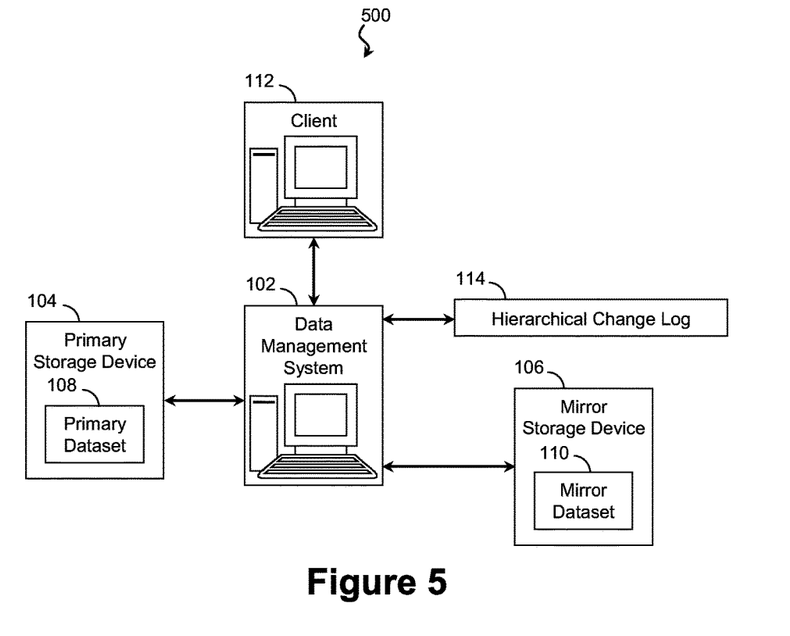
FIG. 5 is a system diagram of a computing infrastructure operable to modify a mirror dataset according to aspects of the present disclosure.

A method 400 of asynchronously managing a mirror dataset 110 utilizing a hierarchical change log 114 is disclosed with reference to FIGS. 4-12. FIG. 4 is a flow diagram of the method 400 of asynchronously managing the mirror dataset 110 utilizing a hierarchical change log 114 according to aspects of the present disclosure. It is understood that additional steps can be provided before, during, and after the method 400 and that some of the steps described can be replaced or eliminated for other embodiments of the method 400. The method 400 is suitable for performing by a computing entity (e.g., data management system 102 of FIGS. 1A and 1B). FIG. 5 is a system diagram of a computing infrastructure 500 operable to modify the mirror dataset 110 according to aspects of the present disclosure. FIGS. 6-12 are diagrams of a hierarchical change log 114 tracking a data transaction utilizing the method 400 of asynchronously managing the mirror dataset 110 according to aspects of the present disclosure.

Referring first to block 402 of FIG. 4 and to FIG. 5, a computing infrastructure 500 creates and maintains a hierarchical change log 114 recording the coherency of a mirror dataset 110 stored on a mirror storage device 106. The computing infrastructure 500 may include a data management system 102, a hierarchical change log 114, a primary storage device 104, a primary dataset 108, a mirror storage device 106, and a mirror dataset 110, each substantially similar to the respective element disclosed with reference to FIGS. 1A and 1B.

Figure 6:
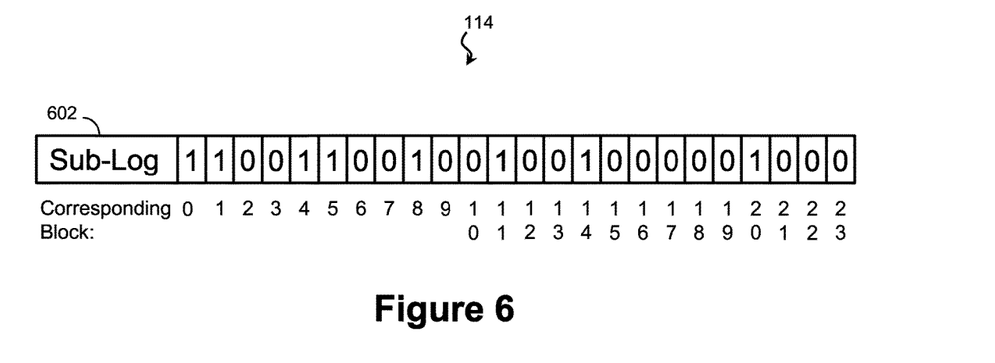
FIGS. 6-12 are diagrams of a hierarchical change log tracking a data transaction utilizing a method of asynchronously managing a mirror dataset according to aspects of the present disclosure.

Referring now to FIG. 6, the hierarchical change log 114 includes at least one sub-log 602 indicating blocks of the corresponding mirror dataset 110 that are not up-to-date with respect to the primary dataset 108. In an embodiment, modified blocks are represented by a binary "1" while unmodified are represented by a binary "0." However, this distinction is arbitrary and other embodiments utilize other representations. In the illustrated embodiments, the sub-log 602 is a bitmap-type change log. In further embodiments, the sub-log 602 may take any suitable form including a sparse matrix representation.

Figure 7:
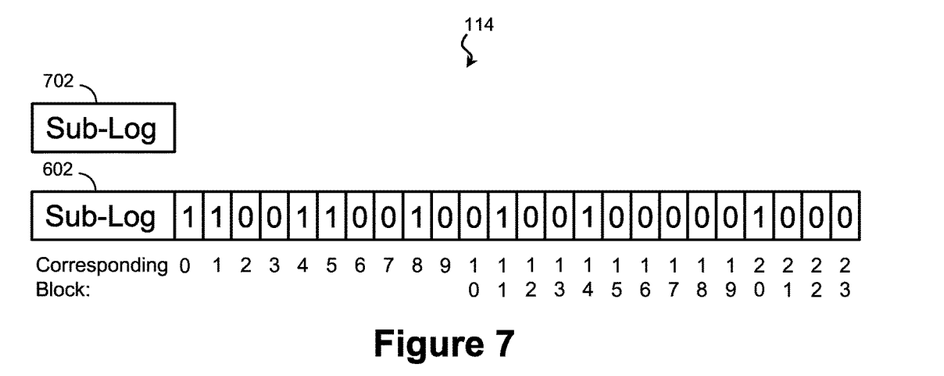

Referring to block 404 of FIG. 4 and to FIG. 7, the data management system 102 initiates a modification to the dataset and creates a corresponding sub-log 702 (referred to as the second sub-log 702 merely for clarity of reference) of the hierarchical change log 114 to track the progress of the modification. The modification may be directed to the primary dataset 108 such as a write transaction or may be directed to the mirror dataset 110 such as a synchronization or update. In the illustrated embodiments, the modification includes a scheduled synchronization that copies the contents of the primary dataset 108 to the mirror dataset 110. In further embodiments, the modification includes a write transaction performed based on a write request received from client 112. In yet further embodiments, the data management system 102 initiates other suitable modifications of the dataset.

The second sub-log 702 may track the progress of the corresponding modification exclusively or may be used to track other data transactions, whether concurrent, sequential, or independent. In other words, the hierarchical change log 114 may include a sub-log for each modification or transaction, or may use sub-logs more generally to track multiple transactions. Creating the second sub-log 702 includes designating a priority for the second sub-log 702. In an embodiment, the second sub-log 702 supersedes the initial sub-log 602 and accordingly is assigned a higher priority. For reference, the second sub-log 702 may be referred to as an overlay of the initial sub-log 602 due to the corresponding higher priority.

The second sub-log 702 may take any suitable form. In an embodiment, the second sub-log 702 is a bitmap-type change log and may have the same or different block size (and accordingly the same or different granularity) from the initial sub-log 602. In further embodiments, second sub-log 702 takes other forms such as a sparse matrix representation. A sparse matrix sub-log 702 may be particularly efficient for tracking synchronization operations because synchronization may be performed on data blocks sequentially and in order. For sparse matrix representations that utilize ranges, the synchronization can be tracked by simply changing the boundary of the block range. This can take the place of multiple scattered writes used to track a synchronization using a bitmap sub-log 702.

Figure 8:
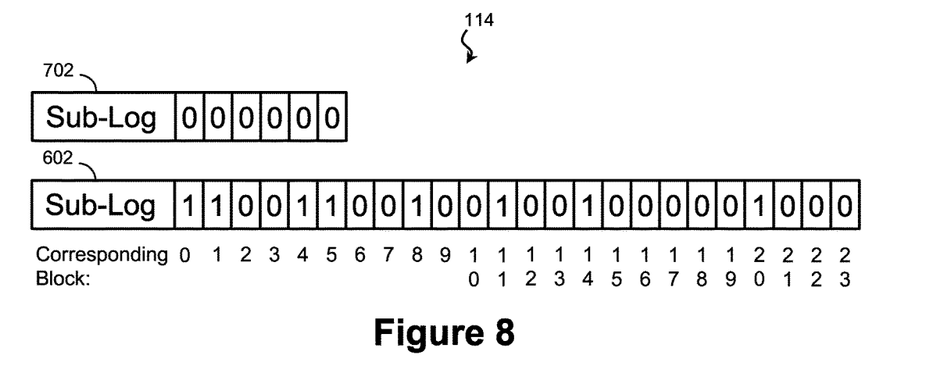

Referring to block 406 of FIG. 4 and to FIG. 8, the second sub-log 702 is updated to track the progress of the synchronization. Immediately after synchronizing, a block of the mirror dataset 110 is identical to the corresponding block of the primary dataset 108. Accordingly, in the illustrated embodiments, the second sub-log 702 represents synchronized blocks in the unmodified coherence state with a "0" value.

Figure 9:
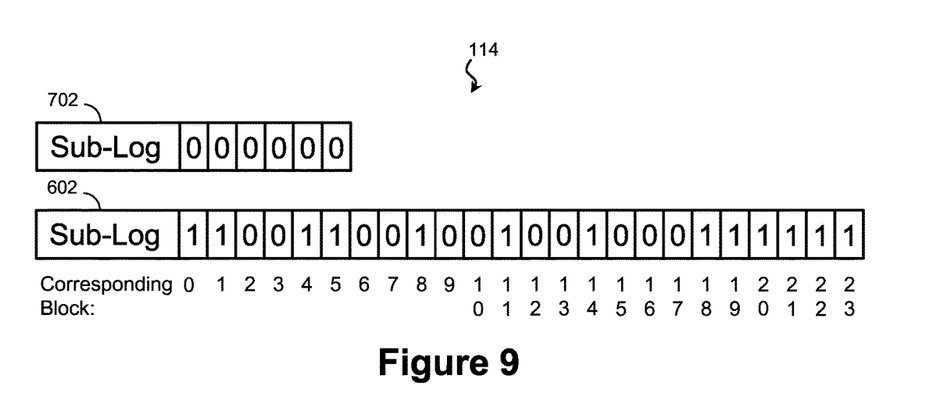
Figure 10:
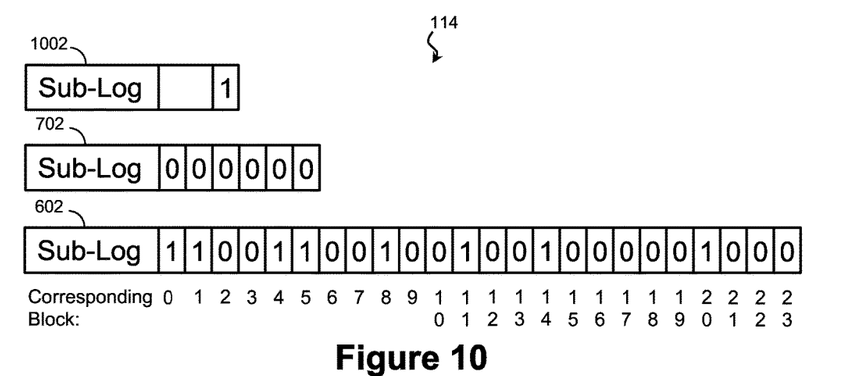

Subsequent modifications to the dataset may be performed while the first modification is in progress. In order to determine where to record the subsequent coherence changes, the sub-logs of the hierarchical change log 114 are queried in order from highest priority to lowest priority. Referring to block 408 of FIG. 4, it is determined whether the subsequent modification affects a block range within the second (higher priority) sub-log 702. If not, in block 410 of FIG. 4, the subsequent modification may be tracked using the first sub-log 602. Referring to FIG. 9, the subsequent modification includes a write to exemplary blocks 18-23 of the dataset, which are not within the block range of the second sub-log 702, and the first sub-log 602 is updated accordingly. Conversely, in block 412 of FIG. 4, if the subsequent modification affects a block range within the second sub-log 702, the subsequent modification may be tracked using the second sub-log 702 or by adding a third sub-log 1002 with a greater priority than both sub-logs 702 and 602 as illustrated by FIG. 10. The procedures of blocks 408-412 may be repeated as needed.

Figure 11:
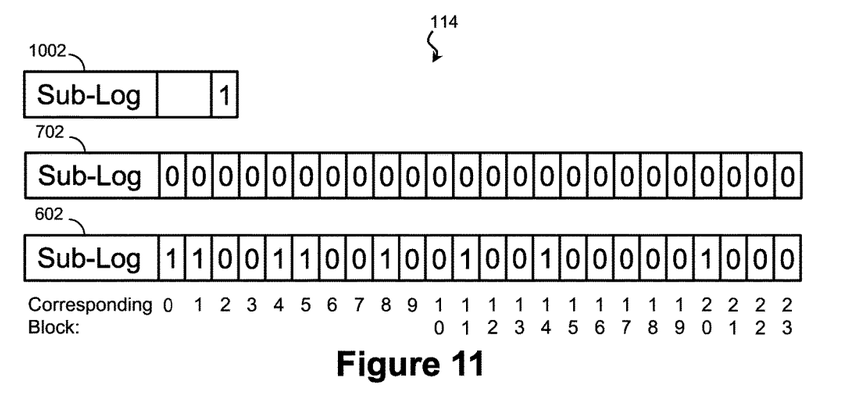
Figure 12:
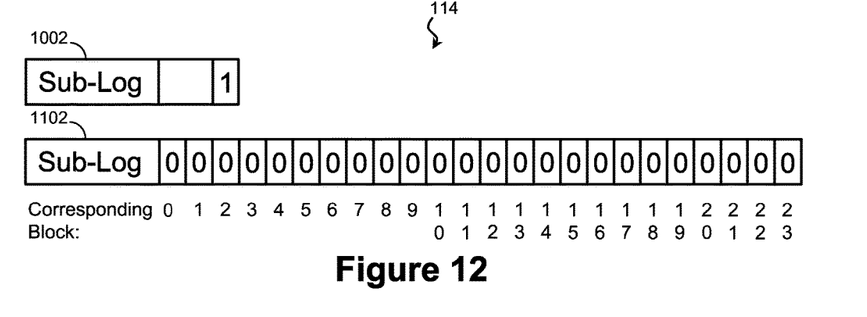

Referring to block 414 of FIG. 4, sub-logs of the hierarchical change log 114 may be flattened. FIGS. 11 and 12 illustrate a hierarchical change log 114 before and after the flattening, respectively. Referring first to FIG. 11, in the illustrated embodiments, sub-logs 702 and 602 are flattened into sub-log 1102 of FIG. 12 once the synchronization of the mirror dataset 110 to the primary dataset 108 is completed. As a result of the synchronization, sub-log 702 contains an "unmodified" coherence state for each block 0-23.

Flattening maintains the priority of the flattened sub-logs. In other words, coherence states contained within higher priority sub-logs (e.g., the second sub-log 702) take precedence over those of lower priority sub-logs (e.g., the first sub log 602). Accordingly, modified and unmodified coherence states of the higher priority sub-log will carry over to the flattened log 1102. Coherence states of the lower priority sub-log will carry over to the flattened log 1102 when corresponding states in the higher priority sub-log are unknown or when the corresponding states are not available. As illustrated in FIG. 12, in some embodiments, the flattened sub-log 1102 may be functionally similar to the higher priority sub-log 702. Because of this, it may be advantageous to discard some or all of the lower priority sub-log 602. From a system performance standpoint, discarding an existing sub-log and re-initializing a new sub-log may prove more efficient than cleaning up the existing sub-log, particularly in embodiments where the higher priority sub-log 702 can be used as the flattened sub-log 1102. In one such embodiment, the first (lower priority) sub-log 602 is discarded and the second (higher priority) sub-log 702 is designated as the flattened sub-log 1102.

Figure 13:
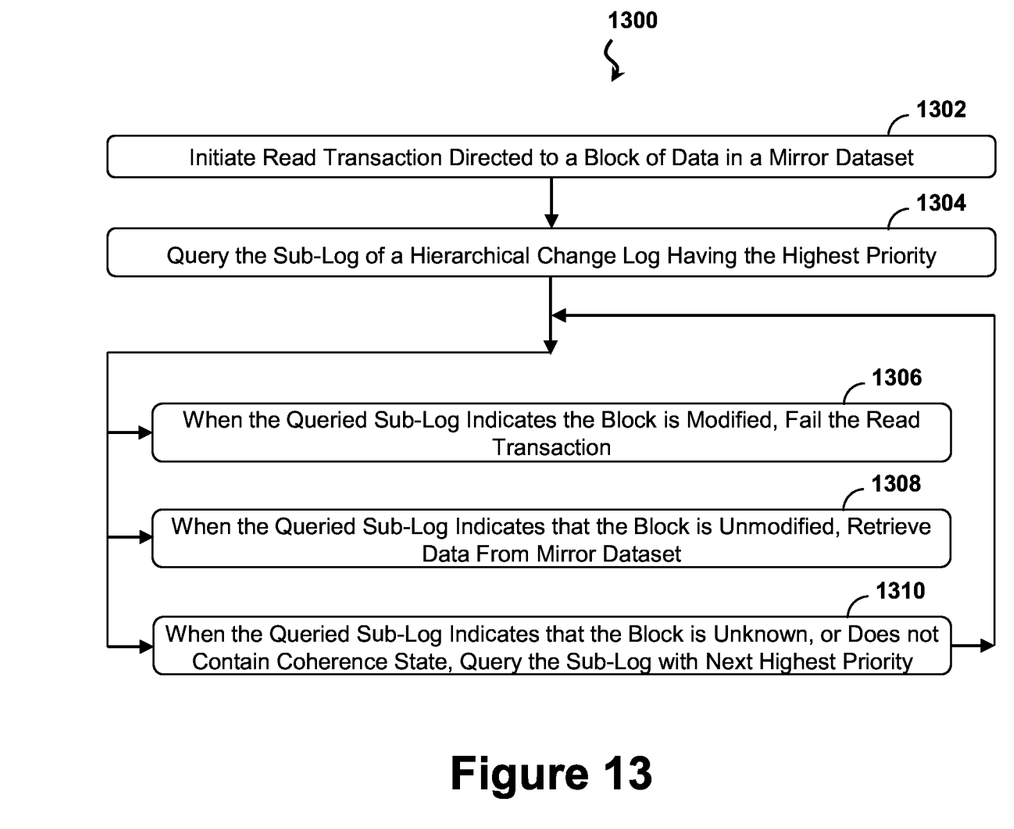
FIG. 13 is a flow diagram of a method of accessing data within a mirror dataset utilizing a hierarchical change log according to aspects of the present disclosure.

Thus, the infrastructure 500 and method 400 can track multiple asynchronous changes to a mirror dataset 110 by using a hierarchical change log 114. The infrastructure 500 is also operable to service read transactions from the mirror dataset 110 while the changes are underway. FIG. 13 is a flow diagram of a method 1300 of accessing data within a mirror dataset 110 utilizing a hierarchical change log 114 according to aspects of the present disclosure. It is understood that additional steps can be provided before, during, and after the method 1300 and that some of the steps described can be replaced or eliminated for other embodiments of the method 1300. The method 1300 is suitable for performing by a computing entity (e.g., data management system 102) of the computing infrastructure 500.

Referring to block 1302, a read transaction is initiated. The read transaction is directed to a block of data in a mirror dataset 110 stored on a mirror storage device 106. In an embodiment, the read transaction is initiated based on a client read request received by a data management system 102. Before reading the block of data from the mirror dataset 110, a hierarchical change log 114 is queried to determine the coherence state of the data block and whether the data block is up-to-date. Referring to block 1304, the query begins with a sub-log of the hierarchical change log 114 having the highest priority. The highest priority sub-log is queried to determine the coherence state.

Referring to block 1306, when the sub-log indicates that the data block is modified and thus out-of-date, the read transaction fails to read from the mirror dataset 110. In some embodiments, a failed read transaction is redirected to a primary dataset 108. In further embodiments, the mirror dataset 110 is synchronized using a primary dataset 108 and the failed read transaction is restarted.

Referring to block 1308, when the sub-log indicates that the data block is unmodified, the read transaction retrieves the data block from the mirror dataset 110.

Referring to block 1310, when the sub-log indicates that the coherence state is unknown or if the sub-log does not have a corresponding entry, the sub-log with the next highest priority is queried to determine the coherence state.

The method 1300 may iterate the query of blocks 1306-1310 until the sub-log with the lowest priority is queried. In many embodiments, the lowest priority sub-log will include a coherence state for each block in the dataset. However, when the sub-log with the lowest priority indicates the coherence state is unknown or does not have a corresponding entry an error may be flagged and the read transaction may be halted. In this way, the method 1300 traces the hierarchy of the change log 114 to determine the coherence state of the target data block.

The present embodiments can take the form of an entirely hardware embodiment, an entirely software embodiment, or an embodiment containing both hardware and software elements. Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, a semiconductor system (or apparatus or device), or a propagation medium.

Thus, the present disclosure provides a system and method for managing distributed coherent datasets using a hierarchical change log. In some embodiments, a distributed storage system is provided. The system includes a primary storage device containing a primary dataset; a mirror storage device containing a mirror dataset, wherein the mirror dataset includes a coherent copy of the primary dataset; and a hierarchical change log tracking coherence states for the mirror dataset, wherein the hierarchical change log includes a first sub-log and a second sub-log, and wherein a block range of the first sub-log overlaps a block range of the second sub-log. In one such embodiment, the hierarchical change log defines a priority relationship between the first sub-log and the second sub-log. In a further such embodiment, the first sub-log and the second sub-log are different in one of a representation and a block size.

In some embodiments, a method of managing a coherency relationship in a distributed storage environment is provided. The method includes creating a first sub-log of a hierarchical change log containing coherence states for a mirror relationship between a primary dataset and a mirror dataset; in response to a data transaction affecting the mirror dataset, creating a second sub-log of the hierarchical change log to track the data transaction, wherein a block range of the second sub-log overlaps a block range of the first sub-log; and defining a priority relationship between the first sub-log and the second sub-log. In an embodiment, the data transaction is a first data transaction, and the method further includes initiating a second data transaction affecting the mirror dataset, the second data transaction being concurrent with the first data transaction; and modifying the hierarchical change log to track the second data transaction.

In some embodiments, an apparatus including a non-transitory, tangible computer readable storage medium storing a computer program is provided. The computer program has instructions that when executed by a computer processor, carry out: initiating a data transaction affecting a mirror dataset; and modifying a sub-log of a hierarchical change log, the sub-log containing coherence states for a bit range of the mirror dataset, wherein the modifying extends a bit range of the sub-log to overlap a bit range of a lower-priority sub-log of the hierarchical change log. In one such embodiment, the data transaction includes a synchronization of the primary dataset and the mirror dataset, and the sub-log includes a sparse matrix representation of the coherence states.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
generating a first sub-log of a hierarchical change log containing a coherence state for a mirror relationship between a first subset of a primary dataset and a first subset of a mirror dataset;
generating a second sub-log of the hierarchical change log containing the coherence state for the mirror relationship between a second subset of the primary dataset and a second subset of the mirror dataset in response to first data changes between the primary dataset and the mirror dataset, the first sub-log having different priority from the second sub-log, wherein the first subset of the primary data set has an overlapping portion with the second subset of the primary dataset; and
parsing the first sub-log and the second sub-log in order of decreasing priority to determine that a coherence state exists between a data block in the mirror dataset and a corresponding data block in the primary dataset.

2. The method of claim 1, wherein the second sub-log has a higher priority than the first sub-log.

3. The method of claim 2, further comprising:
flattening the first sub-log and the second sub-log into a third sub-log, wherein the third sub-log represents the coherence state of the first and second subset of the primary dataset with the first and second subset of the mirror dataset.

4. The method of claim 1, further comprising:
synchronize the primary dataset and the mirror dataset.

5. The method of claim 3, further comprising:
discarding the first sub-log and the second sub-log subsequent to the flattening.

6. The method of claim 1, further comprising:
optimizing the first sub-log according to a first criteria, wherein the first criteria is associated with a priority of the first sub-log in the hierarchical change log.

7. The method of claim 1, wherein the first sub-log comprises a bitmap representation and the second sub-log comprises a sparse matrix representation.

8. The method of claim 1, wherein the coherence state for the data block exists when the first sub-log and the second sub-log indicate that the data block is not modified.

9. The method of claim 1, further comprising:
in response to determining that coherence state exists for the data block, reading the data from the data block in the mirror dataset.

10. A computing device, comprising:
a memory containing machine readable medium comprising machine executable code having stored thereon instructions for performing a method of managing a coherency relationship of multiple datasets in a distributed storage environment; and
a processor coupled to the memory, the processor configured to execute the machine executable code to cause the processor to:
generate a first sub-log of a hierarchical change log containing a first coherence state for a mirror relationship between a first subset of a primary dataset and a second subset of a mirror dataset;
generate a second sub-log of the hierarchical change log containing a second coherence state for the mirror relationship between a second subset of the primary dataset and a second subset of the mirror dataset in response to first data changes between the primary dataset and the mirror dataset, the first sub-log having different priority from the second sub-log, wherein the first subset of the primary data set has an overlapping portion with the second subset of the primary dataset; and parse the first sub-log and the second sub-log in order of decreasing priority to determine that that a coherence state exists between a data block in the mirror dataset and a corresponding data block in a primary dataset.

11. The computing device of claim 10, wherein the second sub-log has a higher priority in the hierarchical change log than the first sub-log.

12. The computing device of claim 11, wherein the processor is further configured to flatten the first sub-log and the second sub-log into a third sub-log, wherein the third sub-log represents the coherence state of the first and second subset of the primary dataset with the first and second subset of the mirror data set.

13. The computing device of claim 11, wherein the processor is further configured to synchronize the primary dataset and the mirror dataset.

14. The computing device of claim 10, wherein the processor is further configured to:
discard at least one of the first sub-log and the second sub-log.

15. The computing device of claim 10, wherein to generate the first sub-log the processor is further configured to optimize the first sub-log according to a first criteria, and to generate the second sub-log the processor is further configured to optimize the second sub-log according to a second criteria.

16. The computing device of claim 10, wherein the processor is further configured to generate the first sub-log in a bitmap representation and the second sub-log in a sparse matrix representation.

17. A non-transitory machine readable medium having stored thereon instructions for performing a method comprising machine executable code which when executed by at least one machine, causes the machine to:
generate a first sub-log of a hierarchical change log containing a coherence state for a first subset of a mirror relationship between a first subset of a primary dataset and a mirror dataset;
conduct a transaction affecting the mirror dataset;
generate a second sub-log, different from the first sub-log of the hierarchical change log containing the coherence state for a mirror relationship between a second subset of the primary dataset and a second subset of the mirror dataset as a result of the transaction, the first sub-log having different priority than the second sub-log, wherein the first subset of the primary dataset overlaps the second subset of the primary dataset; and
parse the first sub-log and the second sub-log in order of decreasing priority to determine that a coherence state exists between a data block in the mirror dataset and a corresponding data block in the primary dataset.

18. The non-transitory machine readable medium of claim 17, wherein the machine executable code is further configured to generate the first sub-log in a bitmap representation and the second sub-log in a sparse matrix representation.

19. The non-transitory machine readable medium of claim 17, wherein the machine executable code is further configured to synchronize the primary dataset and the mirror dataset.

20. The non-transitory machine readable medium of claim 17, wherein the machine executable code is further configured to flatten the first sub-log and the second sub-log into a third sub-log, wherein the third sub-log represents the coherence state of the first and second subset of the primary dataset with the first and second subset of the mirror data set.

* * * * *